United States Patent [19]

Sarto

[11] Patent Number: 5,131,115
[45] Date of Patent: Jul. 21, 1992

[54] VARIABLE POSITION DOOR HOLDER AND STOP

[75] Inventor: Julius A. Sarto, San Jose, Calif.
[73] Assignee: J. Sarto Co., San Jose, Calif.
[21] Appl. No.: 647,306
[22] Filed: Jan. 28, 1991
[51] Int. Cl.⁵ ............................................. B65H 59/10
[52] U.S. Cl. .................. 16/82; 16/DIG. 17; 188/67
[58] Field of Search .............. 16/82, 85, DIG. 17; 188/67, 129, 381; 292/DIG. 7, DIG. 19

[56] References Cited

U.S. PATENT DOCUMENTS 3,893,730  7/1975  Homier et al. ..................... 188/67
4,545,322  10/1985  Yang ........................... 16/DIG. 17

Primary Examiner—Robert L. Spruill
Assistant Examiner—Carmine Cuda
Attorney, Agent, or Firm—Kenneth D'Alessandro

[57] ABSTRACT

A mechanism is provided for maintaining an open door in a selected fixed position includes a keyed shaft which passes through a plurality of elliptically shaped discs via apertures centrally located in the discs are mounted. The long axis of each disc is aligned to that of the other discs and the discs are pressed together from either side along the axis of the shaft between two compression springs. Angled stop members located to the outside of the compression springs displace the discs along their long axis at a small angle from the plane perpendicular to the shaft. The small angle is chosen to produce a substantially circular projection of the discs in a plane perpendicular to the shaft. The shaft, with its mounted discs, springs, and angled stop members, is placed within a housing of cylindrical cross section having an interior diameter selected such that the discs are in frictional contact with the internal surface of the housing and the shaft is thus slidably but frictionally disposed in the housing.

7 Claims, 3 Drawing Sheets

VARIABLE POSITION DOOR HOLDER AND STOP

BACKGROUND OF THE INVENTION

1. Field of the Invention

The present invention relates to mechanical devices. More particularly, the present invention relates to devices for allowing variable positioning of a door and for holding a door in a preselected open position while still allowing the door to be easily moved or closed.

2. The Prior Art

There are numerous applications in which the maintaining of an open door in a selected fixed position is useful. Examples of such applications in the automotive field include doors on automobiles, vans and trucks, as well as automobile hoods and trunk lids. There are also many other fields where the maintaining of an open door in a selected fixed position would be of use.

There are devices known for holding a door in an open position. Such devices include a wide range of different mechanisms and employ numerous operating principles. There is always room for improvement of such devices.

BRIEF DESCRIPTION OF THE INVENTION

According to the present invention, a mechanism is provided for maintaining an open door in a selected fixed position which includes a shaft which passes through a plurality of elliptically shaped discs via apertures centrally located in the discs. The long axis of each disc is aligned to that of the other discs and the discs are pressed together from either side along the axis of the shaft between two compression springs. Angled stop members located to the outside of the compression springs may be used to displace the discs along their long axis at a small angle from the plane perpendicular to the shaft. The small angle is chosen to produce a substantially circular projection of the discs in a plane perpendicular to the shaft.

The angled stop members are pressed against the discs and springs and the shaft, with its mounted discs, compression springs, and angled stop members, is placed within a housing of cylindrical cross section. The interior diameter of the housing is selected such that the discs may be placed in frictional contact with the internal surface of the housing by backing off one or both of the stop members after the shaft has been placed in the housing and the shaft is thus slidably but frictionally disposed in the housing by the frictional coupling between the edges of the discs and the interior surface of the housing caused by the compression springs.

BRIEF DESCRIPTION OF THE DRAWINGS

FIG. 1b is an end view of the apparatus of FIG. 1a.

DETAILED DESCRIPTION OF A PREFERRED EMBODIMENT

Figure 1A:
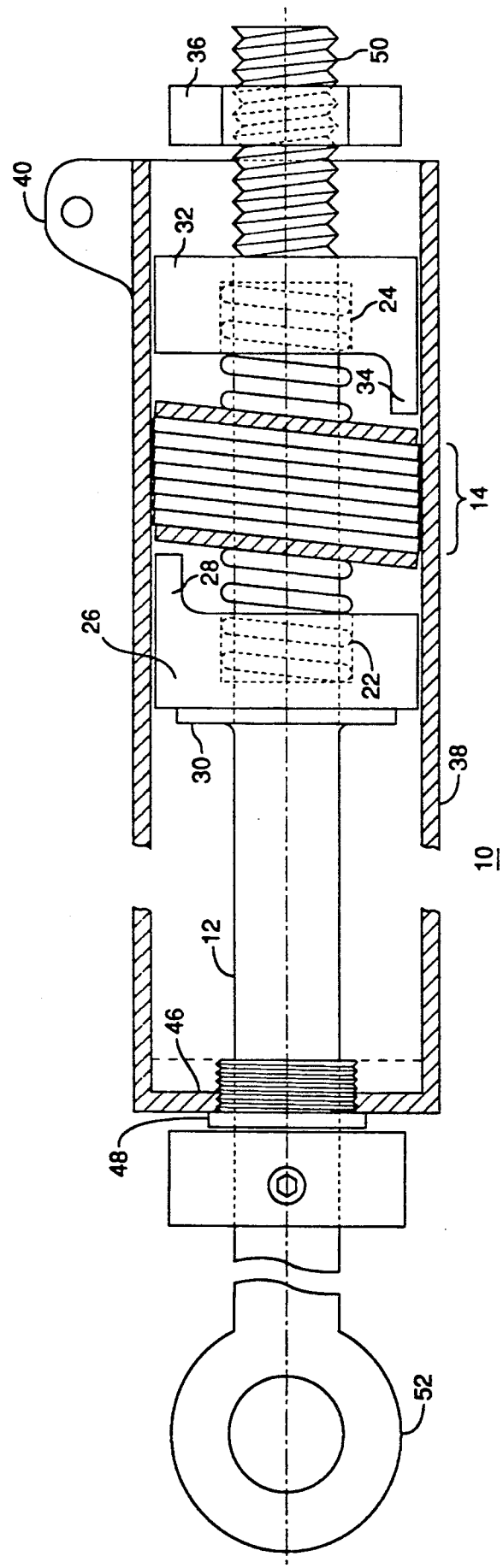
FIG. 1a is a cross sectional diagram of an apparatus according to a first embodiment of the present invention.

Referring first to FIG. 1a, a cross sectional diagram of a variable position door holder and stop apparatus 10 according to a first embodiment of the present invention is shown. In the embodiment of FIG. 1, the variable position door holder and stop 10 includes a shaft 12. Shaft 12 is preferably formed from cold rolled steel or other steel.

A plurality of elliptical discs 14, each including a hole at its center, are mounted on shaft 12 by passing shaft 12 through an aperture in each disc 14. In a presently preferred embodiment discs 14 may be fabricated from plastic materials, such as PVC and other similar materials formed by molding or machining, or from metals, such as brass or aluminum, formed by conventional processes, such as stamping. Embodiments of the present invention have been successfully used incorporating anywhere from three to about twenty discs.

Means are preferably provided for maintaining the discs 14 in a fixed orientation on shaft 12. Shaft 12 may be included with one or more flats 16 (shown more clearly in cross section in FIG. 1b) which mate with shaped holes provided in the discs to maintain the discs 14 in alignment with one another along their major axis when they are in position along shaft 12. Alternately, shaft 12 may be splined, keyed, or provided with other similar features as is known in the art.

Figure 2:
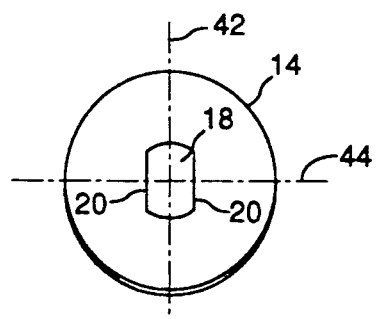
FIG. 2 is a face view of an elliptical disc suitable for use with the embodiment of FIG. 1.

A disc 14 suitable for use with the present invention is shown in a facing view in FIG. 2. An aperture 18 is provided in the center of each disc through which shaft 12 may pass. The aperture 18 in disc 14 of FIG. 2 may preferably include means to maintain the major axis of each disc in alignment with the other discs, and thus aperture 18 of disc 14 of FIG. 2 is shown to include at least one flat edge 20 which will engage the one or more flats 16 of the shaft 12.

Compression springs 22 and 24 are shown mounted around the shaft 12 outward of the plurality of discs 14. Compression spring 22 is nested within a first pusher member 26 having a pusher surface 28, shaft 12 passes through both the center of compression spring 22 and a centrally-located axial aperture in first pusher member 26. A first stop means 30 located on shaft 12 engages first pusher member 26. Shaft 12 also passes through a second pusher member 32 having pusher surface 34 and engages a second stop means 36 located on shaft 12.

First and second pusher members 26 and 32 are mounted on shaft 12 so that pusher surfaces 28 and 34 are disposed at positions 180° from one another along the axis of shaft 12. In a presently preferred embodiment, first and second pusher members 26 and 32 may be fabricated from nylon, delrin, or other similar materials.

First and second stop means 30 and 36 are positioned along shaft 12 locations such that compression springs 22 and 24 apply force against the outside surfaces of the outside ones of discs 14 such that discs 14 are forced against the pusher surfaces 28 and 34 of first and second pusher members 26 and 32. Discs 14 are thus forced to assume a position at a small angle from a plane normal to the axis of shaft 12. In a presently preferred embodiment, this small angle is preferably between about 12° to 15°. Those of ordinary skill in the art will observe that the apertures 18 in discs 14 are elongated along the major axis of the disc to allow the discs 14 to rest on shaft 12 at the selected angle.

The assembly including the shaft 12, discs 14, pusher members 26 and 32, and first and second stop means 30 and 36 is placed in a housing 38. Housing 38 is preferably formed from a metal, such as steel or stainless steel seamless tubing. For lighter duty applications, housing 38 may be formed from plastic materials such as PVC. Housing 38 has a cylindrically shaped internal surface. A housing mounting means 40, which may be a projecting tab including a hole for mounting hardware, is provided on housing 38 for fixably mounting the housing 38 to either a door or to a door frame.

The size of elliptical disc 14 is chosen such that its minor axis 44 (seen in FIG. 2) is slightly smaller than the inside diameter of the cylindrical internal surface of housing 38. The major axis 42 of disc 14 is chosen so that when the disc assembly is disposed at the selected small angle from the plane normal to the axis of the shaft 12, the projection of the disc 14 on the plane normal to the axis of shaft 12 is substantially circular. Housing 38 is provided with end piece 46 through which shaft 12 may pass. As is known in the art, a bushing 48 may be provided in end piece 46 to allow unimpeded and directed motion of shaft 12 through end piece 46.

In a presently preferred embodiment of the invention, one of stop members 30 and 36 is made to be adjustable. One means for providing an adjustable stop member according to a presently preferred embodiment of the invention is to provide threads 50 at one end of shaft 12 which accept nut 36. By moving nut 36 along shaft 12 by means of threads 50, nut 36 acts as both a tension adjustment means and as second stop means. The end of shaft 12 opposite to nut 36 is provided with a mounting means 52 for fixably mounting it to a door or door frame when the apparatus of the present invention is in use.

When assembling the above-described apparatus of the preferred embodiment of the present invention, first stop means 30, the discs 14, pusher members 26 and 32 and compression springs 22 and 24 are mounted on the shaft, making certain to orient pusher members 26 and 32 so that pusher surfaces 28 and 34 are in opposing relationship. In embodiments where shaft 12 is provided with flats or is keyed, the apertures through which pusher members 26 and 32 are mounted on shaft 12 may be likewise keyed or provided with flats to assure that this relationship between them is maintained.

A washer is placed over shaft 12 at its threaded end and nut 36 is engaged in threads 50, and the assembly is placed in the housing 38. The nut 36 is tightened on threads 50 until the pusher surfaces 28 and 34 of pusher members 26 and 32 have been forced tightly against the surfaces of the outer discs, thus forcing the discs to their fully angled position. The shaft should slide easily through the housing 38. Nut 36 is then backed off, allowing the compression springs 22 and 24 to force the discs back towards the plane perpendicular to the axis of the shaft. As this occurs, the discs will begin to contact the inner surface of the housing and a frictional force will be asserted between the disc edges and the inner surface of the housing 38. The nut is preferably loosened until the desired effect is achieved.

Shaft 12 and housing 38 may be made as long as is required given the throw of the door with which the apparatus of the present invention is to be used. Those of ordinary skill in the art will recognize that the inner surface of housing 38 can be flared, i.e., its inner diameter may be slightly expanded, in a region corresponding to the shaft position when the door to which the apparatus is mounted is approaching its closed position. This flaring of the inner surface of housing 38 will allow for a reduced frictional force between the disc edges and the inner surface of housing 38 in this region, thus reducing the force needed to close the door. This technique is believed to be particularly useful where the apparatus of the present invention is used with automobile doors.

Figure 3:
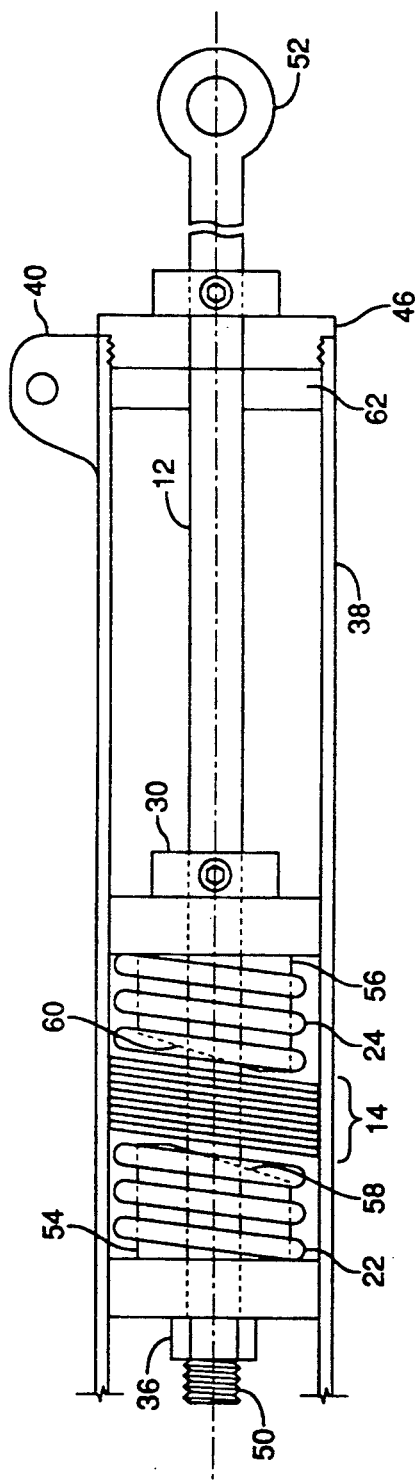
FIG. 3 is a cross sectional diagram of an apparatus according to a second embodiment of the present invention.

Referring now to FIG. 3, a presently preferred embodiment of variable position door holder and stop apparatus according to the present invention is depicted. The embodiment of FIG. 3 is similar to the embodiment shown in FIGS. 1a, 1b and 2, and differs by the arrangement of the pusher members used.

A plurality of discs 14 are mounted on shaft 12 between compression springs 22 and 24. Internal pusher members 54 and 56 are disposed around shaft 12 and inside compression springs 22 and 24. The inward-facing contact surfaces 58 and 60 of internal pusher members 54 and 56 are formed at the selected small angle from the plane perpendicular to the axis of shaft 12 at which it is desired to dispose discs 14. Because internal pusher members 54 and 56 lie within the coils of compression springs 22 and 24, internal pusher members also act as bushings for compression springs 22 and 24.

Figure 1B:
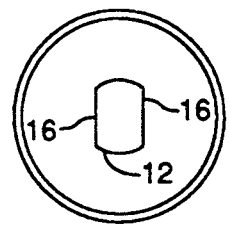

The embodiment of FIG. 3 may be assembled in the same manner as described with respect to the embodiment of FIGS. 1a and 1b making sure that contact surfaces 58 and 60 of internal pusher members 54 and 56 are oriented parallel to one another. In embodiments where shaft 12 is provided with flats or is keyed, the apertures through which pusher members 54 and 56 are mounted on shaft 12 may be likewise keyed or provided with flats to assure that this relationship between them is maintained.

In the embodiment of FIG. 3, end piece 46 is shown as a separate piece which may be mounted into the end of housing 38 by suitable known means, such as mating threads on end piece 46 and the inner surface of housing 38 as shown in FIG. 3. A cushioning member 62, fabricated from, for example, neoprene rubber, may be disposed in housing 38 abutting end piece 46 for the purpose of absorbing the end-of-travel shock between stop 30 and end piece 46.

In several actual examples of the presently preferred embodiment, apparatus fabricated according to FIG. 3 successfully held an automobile door weighing approximately 100 pounds at any open position and required 10–12 pounds of pressure to close the door. A 0.375 inch diameter cold rolled steel shaft was threaded for a length of one inch at one end. Two springs rated at about between 400 to 700 pounds and 0.875 inches long were mounted on the shaft outside of a plurality of elliptically shaped brass discs. Two pushers fabricated from Delrin, each having a diameter of about 0.003 to 0.005 inches less than the inside diameter of the housing, and having pushing ends formed to set the discs at an angle of about 12° from the plane perpendicular to the axis of the shaft were forced against the springs with a pressure of about 300–700 pounds using a nut and washer. From three to fifteen 0.040 thick brass discs were tried, each disc having a diameter along its minor axis of about 0.003 to 0.005 inches less than the inside diameter of the housing and a diameter along its major axis about equal to its diameter along its minor axis divided by the cosine of the small angle (i.e., 12°) which the discs make with the plane perpendicular to the axis of the shaft. In one example, six brass discs were used alternated with five PVC plastic discs.

In each example, the assembly was placed in a steel seamless tubing housing having an inside diameter of about 1 and 1/16 inches. The housing was pivotally fastened to the frame of the auto door and the end of the shaft opposite to the threaded end was pivotally fastened to the door.

The apparatus of the present invention operates using the friction created between the discs 14 and the inner surface of housing 38. Compression springs 22 and 24 force the surfaces of the discs 14 adjacent to their major axis against the surface of the inner walls of housing 38. By varying the size of inner diameter of housing 38, the number of discs 14 and the material from which they are made, the tension of compression springs 22 and 24, or any combination of these parameters, the frictional force applied by the apparatus of the present invention is adaptable for use with doors having a wide range of weights such that the door to which it is attached will remain at any open position in which it is placed but will be easily closed or moved to other positions using a reasonable amount of force. A "reasonable amount of force" as used herein means an amount of force which is within the range of force typically asserted by an average person opening or closing a door of the type to which the present invention is attached. For a typical automobile door, depending on its size and mass, this amount of force is in the range of between about 10 and 20 pounds of force. For other types of doors, this force will assume other known values.

Figure 4:
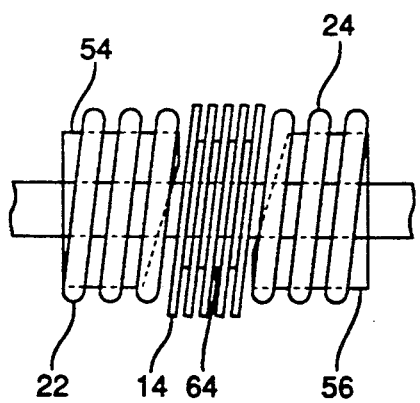
FIG. 4 is a side view of a plurality of discs and spacers shown mounted between compression springs and pusher members on a portion of a shaft.

In an alternate embodiment of the present invention, spacers 64 may be alternated with discs 14. Each spacer 64 may have a thickness approximately equal to the thickness of the discs used and a diameter less than the diameter of disc 14 along its minor axis and may be fabricated from a resilient material, such as neoprene rubber. An assembly of discs 14 and spacers 64 is shown mounted on a portion of shaft 12 in FIG. 4 between compression springs 22 and 24 and pusher members 54 and 56. Spacers 64 act to allow discs 14 to move independently of one another in their contact with the inner surface of housing 38 which results in progressive engagement of the discs with the inner surface of housing 38.

While presently preferred embodiments of the present invention have been disclosed herein, the disclosure will enable those of ordinary skill in the art to realize other embodiments of the invention without departing from the spirit of the invention. It is intended that such embodiments fall within the scope of the present invention, which is to be limited only by the scope of the appended claims.

What is claimed is:

1. Apparatus for holding a door in a selected open position with respect to a door frame to which it is pivotally mounted, including:
    a housing having substantially cylindrical inner surface, said housing adapted to be connected to either said door or said door frame,
    a shaft disposed within said housing, said shaft having a plurality of substantially elliptically shaped discs in facing contact with one another mounted thereon by passing said shaft through apertures centered in said discs, said discs each having a major axis aligned with the major axis of each other one of said discs, said discs disposed at a small angle with respect to the plane perpendicular to the axis of said shaft, the regions of the edges of each of said discs adjacent to its major axis being in frictional contact with said inner surface of said housing, said shaft adapted to be connected to either said door or said door frame,
    means for pressing said plurality of discs together and for forcing said regions of the edges of each of said discs adjacent to its major axis against said inner wall of said housing to establish a predetermined amount of frictional force between said regions of said plurality of said discs and said inner wall, said predetermined amount of frictional force being sufficient to maintain said door stationary with respect to said door frame but low enough to allow movement of said door with respect to said door frame with a reasonable amount of force.

2. Apparatus for holding a door in a selected open position with respect to a door frame to which it is pivotally mounted, including:
    a housing having substantially cylindrical inner surface, said housing adapted to be connected to either said door or said door frame,
    a shaft disposed within said housing, said shaft having a plurality of substantially elliptically shaped discs in facing contact with one another mounted thereon by passing said shaft through apertures centered in said discs, said discs each having a major axis aligned with the major axis of each other one of said discs, said discs disposed at a small angle with respect to the plane perpendicular to the axis of said shaft, said angle being between approximately 10° to 15°, the regions of the edges of each of said discs adjacent to its major axis in contact with said inner surface of said housing, said shaft adapted to be connected to either said door or said door frame,
    means for pressing said plurality of discs together and for forcing said regions of the edges of each of said discs adjacent to its major axis against said inner wall of said housing to establish a predetermined amount of frictional force between said regions of said plurality of said discs and said inner wall, said predetermined amount of frictional force being sufficient to maintain said door stationary with respect to said door frame but low enough to allow movement of said door with respect to said door frame with a reasonable amount of force.

3. Apparatus for holding a door in a selected open position with respect to a door frame to which it is pivotally mounted, including:
    a housing having substantially cylindrical inner surface, said housing adapted to be connected to either said door or said door frame,
    a shaft disposed within said housing, said shaft having a plurality of substantially elliptically shaped discs in facing contact with one another mounted thereon by passing said shaft through apertures centered in said discs, said discs each having a major axis aligned with the major axis of each other one of said discs, said discs disposed at a small angle with respect to the plane perpendicular to the axis of said shaft, said angle being between approximately 10° to 15°, the regions of the edges of each of said discs adjacent to its major axis in contact with said inner surface of said housing, said shaft adapted to be connected to either said door or said door frame,
    a pair of compression springs, one of said springs compressively mounted on said shaft on either side of said plurality of discs and in contact with the outer ones of said plurality of discs so as to press said plurality of discs together and to force said regions of the edges of each of said discs adjacent to its major axis against said inner wall of said housing to establish a predetermined amount of frictional force between said regions of said plurality of said discs and said inner wall, a pair of pusher members, each of said pusher members having a contacting face disposed at said small angle, one of said pusher members mounted around said shaft on either side of said plurality of said discs such that its contacting face is adjacent to one of the outer ones of said discs, said predetermined amount of frictional force being sufficient to maintain said door stationary with respect to said door frame but low enough to allow movement of said door with respect to said door frame with a reasonable amount of force.

4. The apparatus of claim 3 wherein the number of said plurality of discs is between 3 and 20.

5. The apparatus of claim 4 wherein said discs are formed from a metal having a hardness less than the hardness of said inner surface of said housing.

6. The apparatus of claim 5 wherein said discs are formed from brass.

7. The apparatus of claim 3 wherein the number of discs is between 3 and 21 and wherein first ones of said discs are formed from a metal having a hardness less than the hardness of said inner surface of said housing and second ones of said discs are formed from a plastic material and said first and second ones of said discs are interleaved with one of said first ones of said discs in contact with each of said compression springs.

* * * * *